United States Patent Office 3,484,194
Patented Dec. 16, 1969

3,484,194
PROCESS FOR MAKING A FAUJASITE-TYPE
CRYSTALLINE ZEOLITE
Saul Gerald Hindin, Mendham, and Joseph C. Dettling,
Forest Hills, N.J., assignors to Engelhard Industries,
Inc., a corporation of Delaware
No Drawing. Filed Sept. 21, 1966, Ser. No. 580,887
Int. Cl. C01b 33/28
U.S. Cl. 23—113                              9 Claims

ABSTRACT OF THE DISCLOSURE

There is disclosed a method of making a crystalline aluminosilicate of the faujasite structure having a silica to alumina mole ratio of at least about 4:1 and advantageously about 4.3 to 5.3:1 with yields of at least about 85% and high purity through a simple process with inexpensive starting materials. The process involves acidifying sodium silicate, preferably with a mineral acid, to obtain a silica hydrogel from which the acid anions can be removed, and treating the resulting silica gel in hydrated form with a sodium aluminate solution usually containing added sodium hydroxide. The mixture is aged at two different temperature levels.

This invention relates to an improved method for the production of crystalline aluminosilicates. More specifically, this invention concerns the manufacture of crystalline aluminocilicates of the faujasite-type having a silica to alumina mole ratio of at least about 4:1 and relatively uniform pores in the 9 to 15 Angstrom unit range.

Various processes for the preparation of crystalline aluminosilicates from silica and aluminum-containing materials have heretofore been proposed. Thus, for example, crystalline aluminosilicates having a silica to alumina mole ratio of about 2.5 to 3.5 can be readily prepared by methods which in general involve digesting aqueous solutions of sodium silicate and sodium aluminate at elevated temperatures. The raw materials required for manufacturing these low-silica, crystalline aluminosilicates are relatively inexpensive. Attempts to prepare high-silica, crystalline aluminosilicates having a silica to alumina mole ratio greater than 3.9 directly from inexpensive sources of silica, e.g. sodium silicate solutions, have however met with difficulty, see U.S. Patent No. 3,227,660, column 2.

One of the well known methods for the manufacture of high-silica, crystalline aluminosilicates, requires a silica hydrosol as the major starting material. These hydrosols, as exemplified by the commercial "Ludox," are prepared by extetnsive ion-exchanging of sodium silicate solutions. This procedure is expensive and thus the resulting silica hydrosols are several times as costly as sodium silicate, on an equivalent SiO₂ basis. Thus, for example, in U.S. Patent 3,130,007, when it was desired to prepare a crystalline aluminosilicate having a silica to alumina mole ratio of greater than 3.9 silica sources such as expensive aqueous colloidal silica sols were used as the major source of silica.

One of the most recently disclosed methods for producing high-silica, crystalline aluminosilicates which eliminates the need for using expensive silica hydrosols as the starting material is described in U.S. Patent 3,227,660. In the process of this patent, the patentees use sodium silicate as the major starting material and convert it to a silica hydrogel by conventional methods, i.e., by acidifying a sodium silicate solution to a pH below about 10, and washing and partially drying the resulting hydrogel. Thus, the patentees avoid the expensive ion-exchange treatment as required when preparing silica hydrosols as the starting material. However, in order to obtain crystalline aluminosilicates having a high silica to alumina mole ratio, the patentees found it necessary to use an added peptizing step wherein the silica hydrogel was partially peptized in an aqueous sodium hydroxide solution at an ambient temperature of, e.g., about 10 to 50° C., for up to about 3 hours. The final product contained only about 35 to 70 percent by weight of the desired high-silica, crystalline aluminosilicate. Thus, when one studies the prior art processes, especially those of U.S. Patent Nos. 3,130,007 and 3,227,660, he realizes the difficulty encountered in making crystalline aluminosilicates of high purity with a silica to alumina mole ratio greater than 3.9, inexpensively and in high yields.

According to the process of the present invention, a crystalline aluminosilicate of the faujasite structure having a silica to alumina mole ratio of at least about 4:1, often about 4.3 to 5.3:1, advantageously about 4.8:1, can be prepared by acidifying sodium silicate, preferably with a mineral acid, e.g., HCl, to obtain a silica hydrogel from which anions of the acid are removed, and treating the resulting silica gel in hydrated form with a sodium aluminate solution usually containing added sodium hydroxide, under specified temperature and aging conditions.

The acid anions can be removed by any suitable procedure, for instance, the silica hydrogel may be water washed. Alternatively, when the acid anions can be decomposed at non-deleterious temperaturets, removal of the ions can be accomplished by calcination. Acids which provide suitable decomposable anions include, for instance, nitric acid, formic acid and acetic acid. Calcination should be at temperatures sufficient to decompose the acid anions to gaseous products which are driven off, but the temperature should not be so high as to sinter the silica gel and interfere with its ability to be rehydrated. Temperatures of about 400 to 600° C. are usually suitable for anion removal. The resulting silica gel of reduced anion content can be cooled and contacted with water to form a silica hydrogel acceptable for combination with the sodium aluminate solution.

After acidifying the reaction mixture and water washing the resulting silica gel, if this method of anion removal be used, it may be desirable to remove a portion of the water, e.g., by filtration, by application of pressure or vacuum, or by drying. However, the removal of water is not so great that the silica gel becomes insoluble and unreactive. In any event, the water content of the silica hydrogel and the sodium aluminate which are combined are such that the desired ratios of the constituents of the reaction mixture, including the water, can be obtained. Thus the present process avoids the expensive colloidal silica starting material as well as the peptizing step of the prior art processes and yet provides a crystalline aluminosilicate of high purity with a silica to alumina mole ratio of at least about 4:1 in high yields of at least about 85% to about 95% or even higher and may even be about 100% as determined by X-ray diffraction. The product of this invention may have a lattice constant of about 24.73 to 24.63 A., and preferably the constant is about 24.68 A. indicating an essentially pure form of the desired crystalline aluminosilicate.

The crystalline aluminosilicates prepared by the present process are useful in many industrial applications. For example, they can be used as absorbents to separate mixtures of compounds or to purify gas streams, and can also be used as catalysts, or bases for catalysts. More specifically, these crystalline aluminosilicates in their hydrogen form, or in a multivalent metal form, such as for example, a crystalline aluminosilicate partially or completely exchanged with magnesium, are useful catalysts for isomerization, cracking, and particularly for hydrocracking processes, e.g., the hydrocracking of mineral oil fractions boiling in the range of about 300–1000° F.

In accordance with a more specific embodiment of the present invention, a sodium silicate solution is acidified with hydrochloric acid, to a pH below about 10, followed by washing with water and partially drying to produce a silica hydrogel. The silica hydrogel should be washed substantially free of chloride, which is adsorbed during the gelation of sodium silicate by acidification. The water content of the hydrogel when combined with the sodium aluminate may often vary from about 40 to 95 percent or more by weight. The water content of less than about 40 percent increases the difficulty in producing the desired crystalline aluminosilicate. The silica hydrogel is then mixed with the solution of sodium aluminate, usually containing added sodium hydroxide, followed by a low temperature aging period, and then a relatively high temperature crystallization period. The addition of sodium hydroxide, sodium aluminate and water can be such as to give a medium having the compositional mole ratios of $Na_2O/SiO_2$ of about 0.2–0.6:1, preferably 0.3–0.5:1; $SiO_2/Al_2O_3$ of about 8–30:1, preferably 8–15:1; and $H_2O/Na_2O$ of about 25–80:1, preferably 35–50:1. These ratios may vary somewhat, especially an excess of silica to alumina may be present.

After mixing and stirring the added ingredients, the solution is allowed to age at temperatures of about 10 to 50° C., preferably about 25 to 45° C., for a period of about 10 to 100 hours, preferably about 20 to 35 hours. Following this low temperature aging period, the solution is heated to a temperature of about 85 to 110° C., preferably about 90 to 98° C., and allowed to remain at this temperature for a period, e.g. about 10 to 100 hours, preferably about 24 to 48 hours, during which crystallization of the desired crystalline aluminosilicate takes place. Normally, the solution is allowed to remain quiescent essentially throughout aging period and the crystallization period. The resulting slurry is then filtered, and the crystals are washed with water, for instance, to a pH of about 10 or less, and dried according to any desired procedure.

To convert the crystalline aluminosilicates prepared by the process of the present invention to active hydrocracking and isomerization catalysts, the sodium cations can be replaced, in part or entirely, by ion-exchange with other monovalent or multivalent cations. Among the forms of the crystalline aluminosilicates which can be produced are those obtained by direct synthesis and ion-exchange such as, for example, with lithium, potassium, hydrogen, silver, ammonium, magnesium, calcium, zinc, barium, manganese and aluminum. These forms may easily be obtained from the corresponding sodium forms by conventional ion-exchange techniques. Thus, calcium ion for example may replace part or all of the sodium ions to produce the calcium form, or the sodium ions can also be exchanged partially or completely with ammonium ions and the crystalline aluminosilicate dried and calcined to produce the hydrogen form. Other techniques can be employed to produce the hydrogen form, but the ammonium exchange is the most common.

The ion exchanged crystalline aluminosilicates of the present invention possess the required acid function for cracking and isomerization activity. For purposes of hydrocracking or hydroisomerization, it is necessary to incorporate a minor portion of a suitable metal hydrogenating component, e.g. a group VIII metal. The preferred hydrogenating metals comprise the group VIII noble metals, particularly platinum, palladium or rhodium. To incorporate these metals by ion-exchange, the crystalline aluminosilicates, either in the metal or ammonium form are digested with an aqueous solution of a suitable compound of the metal wherein the metal is present in the cationic form, followed, if desired, by reduction to form the free metal, or oxidation to the metal oxide. Alternatively, such metals may be incorporated by an impregnation procedure, e.g. by contact of the aluminosilicate with $H_2PtCl_6$, $(NH_4)_2Pt(SCN)_6$, $PdCl_2$, etc.

The following examples illustrate the process of the present invention, but are not to be considered limiting.

EXAMPLE I

A crystalline aluminosilicate was prepared in the following manner:

A 100 gm. sample of aqueous sodium silicate solution (28.7 grams $SiO_2$, "N" brand, Philadelphia Quartz Co.) was diluted with 200 cc. of water and cooled to room temperature of about 85° F. To this solution was added, with stirring, 15 cc. of concentrated hydrochloric acid having a normality of about 12. The hydrogel was then diluted with 500 cc. of $H_2O$ and then washed with water until the chloride ion was removed. The washed material was dried at 110° C. for about 2 hours until the water content was 79 percent by weight. To 102 grams of the partially dried hydrogel was added a room temperature solution of 8.6 grams of sodium alummate (46.0 wt. percent $Al_2O_3$, 31.0% $Na_2O$, 25.0 wt. percent $H_2O$) and 6.8 grams of sodium hydroxide dissolved in 23 ml. of water. The mole ratios of materials in the mixture were as follows: $1Al_2O_3/8.5SiO_2/3.3Na_2O/159H_2O$. A portion of the mixture was then aged at a temperature of 30° C. for 24 hours, followed by heating and aging at 95° C. for 40 hours during which time crystalline aluminosilicate was formed. The material was water washed to a pH of about 10 and dried at 110° C. The resulting product was a faujasite-type crystalline aluminosilicate having a silica to alumina mole ratio of about 4.8:1 and a lattice constant of 24.70±0.02 Angstroms. The yield based on the $Al_2O_3$ added was 90%, and the crystalline material contained about 100% of the crystalline aluminosilicate of the faujasite-type as determined by X-ray diffraction.

EXAMPLE II

Another crystalline aluminosilicate was prepared in the following manner:

A 127 gm. sample of aqueous sodium silicate solution (32 grams $SiO_2$, "S-35" brand, Philadelphia Quartz Co.) was diluted with 200 cc. of water and cooled to room temperature of about 85° F. To this solution was added, with stirring, 11 cc. of concentrated hydrochloric acid having a normality of about 12. The hydrogel was then diluted with 500 cc. of $H_2O$ and then washed with water until the chloride ion was removed. The washed material was dried at 110° C. for about 2 hours until the water content was 81 percent by weight. To 103 grams of the partially dried hydrogel was added a room temperature solution of 7.6 grams of sodium alummate (46.0 wt. percent $Al_2O_3$, 31.0% $Na_2O$, 25.0 wt. percent $H_2O$) and 6.0 grams of sodium hydroxide dissolved in 20 ml. of water. The mole ratios of materials in the mixture were as follows: $1Al_2O_3/8.8SiO_2/3.28Na_2O/179H_2O$. A portion of the mixture was then aged at a temperature of 30° C. for 21.5 hours, followed by heating and aging at 95° C. for 40 hours during which time crystalline aluminosilicate was formed. The material was water washed to a pH of about 10 and dried at 110° C. The resulting product was a faujasite-type crystalline aluminosilicate having a silica to alumina mole ratio of about 4.8:1 and a lattice constant of 24.70±0.02 Angstroms.

EXAMPLE III

Another crystalline aluminosilicate was prepared in the following manner:

A 1500 gm. sample of aqueous sodium silicate solution (431 grams $SiO_2$, "N" brand, Philadelphia Quartz Co.) was diluted with 3000 cc. of water and cooled to room temperature of about 85° F. To this solution was added, with stirring, 225 cc. of concentrated hydrochloric acid having a normality of about 12. The hydrogel was then diluted with 4000 cc. of $H_2O$ and then washed with water until the chloride ion was removed. The washed material was dried at 110° C. for about 4 hours until the water content was 76.2 percent by weight. To 718 grams of partially dried hydrogel was added a room temperature solution of 62 grams of sodium aluminate (46.0 wt. percent $Al_2O_3$, 31.0% $Na_2O$, 25.0 wt. percent $H_2O$) and 57 grams of sodium hydroxide dissolved in 187 cc. of water. The mole ratios of materials in the mixture were as follows: $1Al_2O_3/9.5SiO_2/3.68Na_2O/157H_2O$. A portion of the mixture was then aged at a temperature of 30° C. for 24 hours, followed by heating and aging at 95° C. for 41 hours during which time crystalline aluminosilicate was formed. The material was water washed to a pH of about 10 and dried at 110° C. The resulting product was a faujasite-type crystalline aluminosilicate having a silica to alumina mole ratio of about 4.8:1 and a lattice constant of 24.70±0.02 Angstroms.

EXAMPLE IV

Another crystalline aluminosilicate was prepared in the following manner:

To 718 grams of partially dried silica hydrogel (76.2% $H_2O$) of Example III was added a room temperature solution of 69 grams of sodium aluminate (46.0 wt. percent $Al_2O_3$, 31.0% $Na_2O$, 25.0 wt. percent $H_2O$) and 52.8 grams of sodium hydroxide dissolved in 280 cc. of water. The mole ratios of materials in the mixture were as follows: $1Al_2O_3/8.5SiO_2/3.24Na_2O/140H_2O$. A portion of the mixture was then aged at a temperature of 30° C. for 24 hours, followed by heating and aging at 95° C. for 41 hours during which time crystalline aluminosilicate was formed. The material was water washed to a pH of about 10 and dried at 110° C. The resulting product was a faujasite-type crystalline aluminosilicate having a silica to alumina mole ratio of about 4.8:1 and a lattice constant of 24.71 Angstroms.

EXAMPLE V

Another crystalline aluminosilicate was prepared in the following manner:

A 494 gram sample of aqueous sodium silicate solution (142 grams $SiO_2$, "N" brand, Philadelphia Quartz Co.) was diluted with 200 cc. of $H_2O$. The resulting mixture was neutralized with a solution of 90 cc. $HNO_3$ and 500 cc. $H_2O$, stirred and filtered. The filter cake was oven dried at 110° C. for about 21 hours. The material was then heated for 2 hours at 500° C. to decompose the nitrate ion and cooled to room temperature. The final weight of the product was 247 grams. To 124 grams of the resulting silica gel 400 cc. $H_2O$ was added. The mixture was soaked over the weekend and when decanted had 216 grams of $H_2O$ remaining in the rehydrated silica gel. A sodium aluminate solution was prepared by adding 27.9 grams of $NaAlO_2$ to 55 cc. of $H_2O$, and then 32.7 grams of NaOH was combined with the aluminate solution. The mixture was cooled to room temperature and added to the rehydrated silica, and mixed for 15 minutes. The mixture was then aged for 24 hours at 35° C. and for 48 hours at 88° C. The resulting product was a faujasite-type crystalline aluminosilicate having a lattice constant of 24.73 A.

It is claimed:

1. A method for the manufacture of crystalline aluminosilicates of the faujasite structure having a silica to alumina mole ratio of at least about 4:1 which consists essentially of acidifying a sodium silicate solution to a pH below about 10 by the addition of acid having decomposable anions to produce a silica hydrogel, calcining the silica hydrogel to decompose and remove said decomposable acid anions from the silica, combining the resulting silica with water to form a hydrogel, combining sodium aluminate with the silica in unpeptized hydrogel form, allowing the mixture to age at a temperature of about 10 to 50° C. for about 10 to 100 hours, said mixture having a $Na_2O/SiO_2$ mole ratio of about 0.2 to 0.6:1, a $SiO_2/Al_2O_3$ mole ratio of about 8 to 30:1, and a $H_2O$ to $Na_2O$ mole ratio of about 25 to 80:1, heating the aged mixture and allowing it to age a second time at a temperature of about 85 to 110° C. to effect the crystallization of the faujasite crystalline aluminosilicate.

2. A method of the manufacture of crystalline aluminosilicates of faujasite structure having a silica to alumina mole ratio of about 4.3 to 5.3:1 which consists essentially of acidifying a sodium silicate solution to a pH below about 10 by the addition of mineral acid having decomposable anions to produce a silica hydrogel, drying and calcining the silica hydrogel to decompose and remove said decomposable anions from the silica, combining the resulting silica with water to form a hydrogel, combining the silica hydrogel in unpeptized form with a sodium aluminate solution and sodium hydroxide and providing a mixture having a $Na_2O/SiO_2$ mole ratio of about 0.3 to 0.5:1, a $SiO_2/Al_2O_3$ mole ratio of about 8 to 15:1 and a $H_2O$ to $Na_2O$ mole ratio of about 35 to 50:1, allowing the mixture to age at a temperature of about 25 to 45° C. for a period of about 20 to 35 hours, heating the aged mixture and allowing it to age a second time at a temperature of about 90 to 98° C. for about 24 to 48 hours to effect crystallization of the faujasite crystalline aluminosilicate, and recovering from the resulting slurry the faujasite crystalline aluminosilicate in a yield of greater than about 85 based on the $Al_2O_3$ added.

3. The method of claim 1 wherein the silica combined with the sodium aluminate has a water content of at least about 40 percent by weight.

4. The method of claim 2 wherein the silica hydrogel combined with the sodium aluminate has a water content of about 40 to 95% by weight.

5. The method of claim 1 in which the temperature for decomposing the acid anions is about 400 to 600° C.

6. The method of claim 5 in which the acid anion is nitrate.

7. The method of claim 6 wherein the silica hydrogel combined with the sodium aluminate has a water content of about 40 to 95% by weight.

8. The method of claim 2 in which the temperature for decomposing the acid anions is about 400 to 600° C.

9. The method of claim 8 in which the acid anion is nitrate.

References Cited

UNITED STATES PATENTS

| | | | |
|---|---|---|---|
| 3,227,660 | 1/1966 | Hansford | 23—113 X |
| 3,329,627 | 7/1967 | Gladrow et al. | 252—455 X |
| 3,348,911 | 10/1967 | Michalko | 23—112 |

EDWARD J. MEROS, Primary Examiner

U.S. Cl. X.R.

23—112